Nov. 15, 1938.  H. SCHUSTER  2,137,099
METHOD OF MANUFACTURING CIRCULAR SHEET METAL DISKS
Filed Feb. 7, 1935
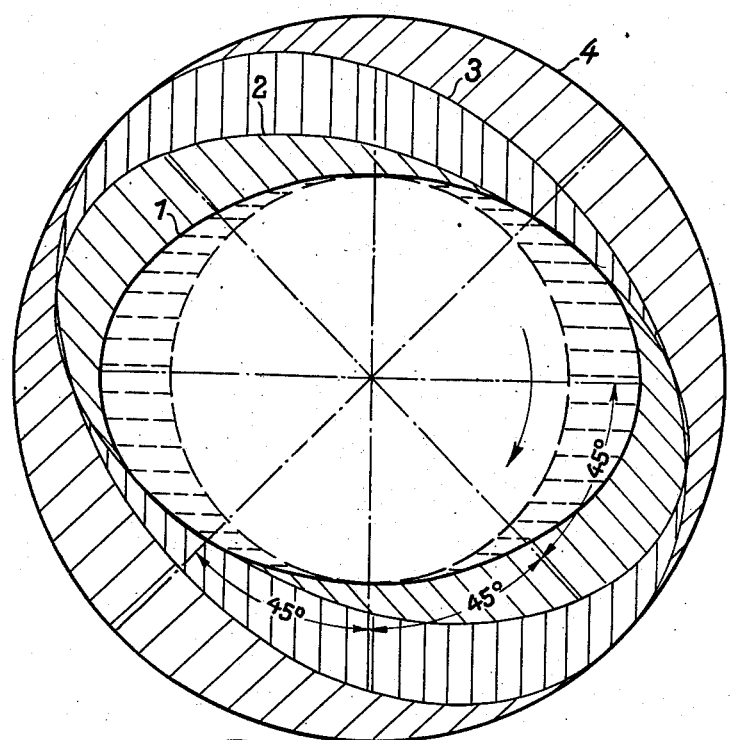
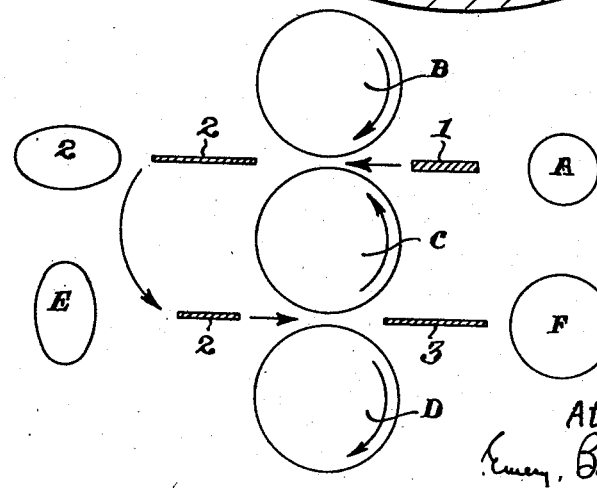
Inventor:
Hans Schuster
Attorneys:
Emery, Booth, Varney & Whittemore.

Patented Nov. 15, 1938

2,137,099

UNITED STATES PATENT OFFICE 2,137,099

METHOD OF MANUFACTURING CIRCULAR SHEET METAL DISKS

Hans Schuster, Immigrath-on-the-Lower-Rhine, Germany

Application February 7, 1935, Serial No. 5,346
In Germany December 15, 1934

6 Claims. (Cl. 80—16)

This invention relates to a method of manufacturing circular sheet-metal disks by rolling out a thicker disk of smaller diameter, such as is described in my former United States patent application Serial Number 747,239. The present application is a continuation in part of said former and co-pending application.

In the method described in my said former application, the work-piece is rolled out between cylindrical rolls in directions at right angles to one another, in succession, the reduction in thickness of each intermediate form, which deviates from the circular shape, being of the same percentage as the reduction in thickness of the immediately preceding circular form from which it was produced. According to my said former application, the thick circular work-piece is reduced and expanded into an elliptically shaped intermediate form by the first pass, then turned through 90° and rolled again, the rolls on the second pass, however, having a suitably narrower passage between them so that the same percentage reduction will be produced as in the previous rolling. In this manner the ellipse is again converted into a disk of exact circular shape. The procedure can be repeated as often as desired.

According to an alternative method of operation, the work-piece which has become elliptical after the first pass is turned through an angle differing from 90° for further reduction in thickness and reconversion into the circular shape, the operation of turning the work-piece through this angle with accompanying further rolling out being repeated until the minor axis of the ellipse has become equal to the major axis, that is to say, until the circular shape has again been attained. This method, as in the case of the method of my former application, can be repeated as often as desired. This rolling-out of the work-piece in different radial directions may under certain circumstances have a favorable action on the texture of the finished disk, particularly when the rolling is carried out in the cold state. Hot rolling is, of course, also possible and may, under some circumstances, be preferable.

In accordance, then, with the second method of operation, the thick circular initial work-piece is first rolled out to a definite reduced thickness and the ellipse thus formed has its major axis at right angles to the axes of the rolls; it is then turned through an angle of (for example) about 45° and in this position is fed through rolls, the passage between which is so dimensioned that the same percentage reduction in thickness (25 per cent, for example) is effected as is the case in the preceding pass. This procedure is then twice repeated in case the turning angle, as assumed, is 45°. The work-piece is, thus, after it has the first time received the elliptical shape, turned three times in all through 45°, and each time fed through rolls which produce a percentage reduction in thickness equal to that produced by the first rolling out step. The work-piece now has a circular shape with a diameter greater than the larger diameter of the ellipse produced in the first instance.

Theoretically, the angle through which the work-piece has to be turned each time in order to enable the elliptical shape to be converted back into the circular shape depends solely upon the number of repetitions of the turning operation through this angle with, of course, the corresponding rollings. Only angles smaller than 90°, however, are of practical importance and are so chosen that reformation into the circular shape is completed after only a few repetitions. If in the example just referred to, an angle of 30° had been taken, then the work piece would have to be turned five times, i. e. altogether through an angle of 150°, while with the assumed angle of 45° it would only have to be turned three times through a total angle of 135°.

Starting with a disk of circular shape, either originally or as produced by a cycle of reducing operations wherein a given angle of turning was employed, the stock may be reduced in the succeeding cycle by turning through other angles. For example, if the stock was turned through angles of 30°, 45° or other small angles during a preceding cycle, it may be turned through 90° or some other angle on the succeeding cycle. Or instead of turning each time in a cycle through equal angles, the stock may be turned through a given angle or angles and finally through an angle which is supplementary to the previous angle of turning. By employing supplementing angles at the end of the cycle the conversion back to circular form may be hastened. However, in any plan of operation the angles of turning must be carefully selected according to the law which I have discovered and which will be more fully stated hereinafter.

Again, the percentage of reduction for each pass in a cycle may also be varied if the herein disclosed law of reduction is followed.

The angle of turning, the percentage of reduction, and the number of passes in a cycle from circular shape to circular shape may be ascertained either graphically or mathematically or by both methods combined in accordance with the herein disclosed law.

It is self evident that the total angle through which the work has to be turned for converting it to the circular shape from the elliptical shape will be smaller the nearer the angle of turning for one pass approaches 90°. In the case of angles which approach 0°, there first of all takes place an increase in the deviation from the circular shape followed later by an approach and evening out to the circular shape. But such initial increase in the deviation from circular shape I find is a drawback and may be avoided if an angle is employed which lies in the neighborhood of 45° or over. Otherwise, that angle is to be preferred by the use of which the smallest possible total angle of rotation will represent a multiple of this angle without remainder, such as in the cases of the angles of 45° and 30° given by way of example. In the case of a great many angles, the smallest possible total angle must be exceeded by further repetition if the otherwise remaining fraction is not to be filled up by a supplementing angle of a different number of degrees which then has to be ascertained while taking into consideration the necessary reduction in thickness.

In the accompanying drawing which illustrates practical applications of the invention:

Fig. 1 illustrates a rolling mill for reducing the stock when the turning between rolling operations is 90°; and Figure 2 illustrates the successive stages of the reconversion of the ellipse to a circle where the turning angle is 45° and where in each pass the percentage reduction in thickness is 25 per cent.

Referring to Fig. 1 of the drawing, a circular disk of stock A is passed between the two upper rolls B and G of a three-high rolling mill to produce the elliptical shape E. This elliptical shape is now turned through 90° and passed between the lower rolls C and D to produce the exact circular shape F.

Referring to Fig. 2, 1 is the initial ellipse which has been produced by rolling out the circular work-piece indicated by broken lines; 2 is the intermediate stage, also elliptical, which results after the work-piece has been turned through 45°; 3 is the further elliptical intermediate stage, and 4 is the finally obtained circular shape. The intermediate elliptical shapes are angularly displaced with respect to the immediately preceding shape. The successive turnings of the work-piece through 45° are to be understood as meaning that the elliptical work-piece taken from the preceding pass is so introduced between the succeeding pair of rolls that the major axis of the ellipse is turned through 45° with respect to the direction of rolling, whereupon after this pass the work-piece is then again turned through a further 45° with respect to the direction of rolling so that it has finally been turned with respect to the direction of rolling through 135°. The major axis of the last ellipse however, as can be seen from the drawing, has only been angularly displaced, with respect to the direction of rolling, through an angle of 45°.

The supplementing angle above referred to cannot always be ascertained with exactness by a simple calculation. Take the case, for example, where an angle of $a°$, with a three times repetition, almost produces the circular shape, which for its complete formation requires a total angle of $b°$ which is somewhat greater than $3a°$. By simple calculation, if one reckons from the first ellipse, a supplementing angle of $b° - 3a$ must be chosen for the fourth pass. But this would not be rigorously correct in every case since it has been ascertained that for altering the ratio between the two axes of the ellipse, the position of the angle bisectors with respect to the rolling axis has to be taken into account, which in the case of a comparatively small angle of rotation is different from that in the case of a larger angle of rotation. This requires a correction to the calculated supplementing angle which would ordinarily, in practice, be determined empirically although undoubtedly it could also be ascertained by calculation.

Since at such repetition of the turning operation and corresponding reduction in thickness, an increase in the size of the work-piece in the directions of both axes of the ellipse takes place, and since we are only concerned with the obtaining of a larger and thinner final disk, it is not always necessary to effect a pass with a supplementing angle in order to reduce the number of passes. Thus, in such cases where a particular angle of turning alone enables a total angle of rotation to be attained which will produce a circular shape after numerous repetitions of the turning operation, this repetition can be chosen instead of the interposition of a supplementing angle.

It is worthy of mention that there is still a further possibility. The ellipse produced in the first instance by turning the work-piece through any desired angle and subsequently reducing it in thickness by rolling, can first of all be converted into another ellipse, angularly displaced and of greater area, the work-piece being then so turned that the major axis of the ellipse lies parallel to the rolls and rolled out in this position with a different percentage reduction in thickness, the extension taking place in a direction at 90° with respect to the major axis as in my former patent application above mentioned. The altered percentage reduction in thickness must be so proportioned that a circular shape now results from the ellipse which was altered with respect to the original ellipse. According to the size of the preceding angle of rotation the percentage reduction in thickness must be greater or less; that is to say, if the preceding angle of rotation was 45° it would have to be smaller than in the case of a preceding angle of rotation of 30°.

It is to be noted as one of the features of the invention that the final working to circular shape is attained by rolling the elliptical work piece at 90° to its major axis, that is, in the direction of its minor axis. The amount of working required can readily be calculated in relation to the previous amount of working in the proportion of the angle turned to the total turning of the previous angle or angles.

In any case where it is desired to produce a circular disk having definite diameter and definite thickness, when the precise treatment has been determined, one may ascertain by graphical or empirical preparatory work, or even purely by calculation backwards, what dimensions the initial work-piece must have. If the case occurs where the particular position of the work-piece in the intermediate stages has to be ascertained with respect to the roll axes and the dimensions of the ellipse of the individual intermediate shapes, then this can be facilitated by making the determination necessary to provide that the major axis of the particular ellipse to be rolled shall extend in the direction of the bisector of the turning angle and that the magnitude of the ratios between the major and the minor axis of the respective ellipse can be set down as ordinates on a sine curve.

As in the case of my former patent application, the initial work-piece is preferably obtained by the reduction of a cylindrical block.

If value is not attached to the obtaining of an exact circle as final shape, that is to say, if an approximation to the circular shape suffices and the exact circular shape is intended to be obtained by another further treatment, e. g. by cutting, then, of course, the described process can be terminated as soon as an ellipse is produced which does not depart excessively from the circular shape. In cases where the finished article is required to be of elliptical shape the process would, of course, not be continued until the circular shape were restored but would be terminated on the obtainment of the desired elliptical shape with the desired dimensions.

As already stated in my former patent application, a thick disk of elliptical shape can be employed as the initial work-piece and further operated upon accordingly until the desired circular metal sheet or elliptical metal sheet having the desired dimensions is obtained.

Furthermore, when employing an angle of rotation which differs from 90°, the work-piece is operated upon in various radial directions, and not merely in two directions at right angles to one another, whereby the texture of the metal is improved. Moreover, the angle of rotation differing from 90° can be also utilized to obtain final forms which differ both from the circular shape and from the elliptical shape; for by employing in the course of the process angles of rotation of different size so that the reduction in thickness in the course of the process varies in percentage, not only the dimensions but also the shape of the final form can be influenced, particularly, if in addition an initial work-piece is chosen which also deviates from the otherwise circular or elliptical shape. By graphical or empirical means which may also be assisted in part by calculation, it is possible in very many cases, in this manner, to obtain a final form of the desired dimensions which may be required at any particular time and for which the initial shape with its dimensions, as well as the shapes and dimensions at the individual steps of the process including the necessary angles of rotation and percentage reductions in thickness, can be ascertained.

It has previously been proposed, for example in the patent to Milliken No. 1,561,346, November 10, 1925, to roll circular disks into elliptical shape and then turn them through 90° and roll them again with the idea of again producing a circular shape. However, no rule of working is given which will assure the return to circular shape. One must experiment to determine the degree of reduction required to restore the elliptical disk to circular shape. Of course, it has long been known, even in the simple arts of rolling dough, putty, modeling clay and the like, that an elliptical shape could be restored to an approximately circular shape by rolling the elliptical shape along its minor axis. But these known methods are experimental and give no definite assurance of producing an exact circular shape; moreover they refer only to the simple case of turning through 90° and furnish no assistance when the stock is turned through angles other than 90°.

According to the present invention the alterations in the disk are performed under a rule or law which will definitely assure the return to exact circular shape when that is desired, regardless of whether the stock is turned through an angle of 90° or any other angle.

To summarize what has been stated and illustrated by example hereinabove, the rule or law may be stated as follow:

Starting with a circular disk of uniform thickness, the stock is rolled a number of times in a cycle to change it from circular shape to elliptical shape and then back into exact circular shape.

The percentage of reduction and the principal axes of the ellipse formed in the first operation in the cycle, or first change from circular to elliptical shape, are taken as reference or datum points upon which subsequent operations in the cycle are based.

The stock is worked in a straight line across its width, that is, along a diameter or axis, whether the operation is a continuous rolling action or otherwise. In any cycle from circular-to-circular it is to be understood that the characteristics of the operating means, so far as side spread of stock is concerned, remain unchanged, or if changed that due account thereof be taken.

In any given cycle from circular-to-circular, the increment in length along one principal axis of the first ellipse is made equal to the increment in length along the other principal axis.

The last operation in the cycle from circular-to-circular is effected along the minor axis of the last elliptical shape.

The change from circular shape to circular shape is preferably effected in a few reducing and turning operations.

The percentage of reduction at each rolling operation is preferably made an aliquot part or simple multiple of the degree of reduction in the first rolling operation from circular. This, of course, includes the case where the subsequent reduction is equal to the first, that is, a unit multiple of the first.

The angle of turning for each rolling operation is preferably made an aliquot part of 90° or of a simple multiple of 90°, such as 180° or 270°, usually not over 180°. The angle of turning will be 90° or less, i. e. an acute angle, since the effect of turning more than 90° is the same as turning less. For example, the effect of turning 135° obviously would be the same as turning 45°, and of turning 150° the same as turning 30°.

When turning by the same angle for each reduction in the cycle, the total number of reducing operations required will be the quotient of 90° divided by half the angle of turning. For example the number of operations when turning 90° will be 2; for 45° the number will be 4; for 30° the number will be 6; for 60° the number will be 3; and so on. The total angle of turning from circular-to-circular will be the number of operations, minus one, multiplied by the angle of turning. For example, when turning 90° the total angle will be (2—1)×90° or 90°; when turning 45° the total angle will be (4—1)×45° or 135°; when turning 30° the total angle will be (6—1)×30° or 150°; when turning 60° the total angle of turning will be (3—1)×60° or 120°; and so on.

When turning through angles which are not simple aliquot parts of 90° or of a simple multiple thereof and when turning through supplementing angles to hasten the return to circular shape, the basic rules are adhered to, namely, that the last reduction is along the minor axis of the last ellipse and that the projected increments in reduction along the two principal axes of the first ellipse are made equal.

When reducing in any turned position by percentages different from the percentage of reduction at the first operation, the basic rules are observed, namely that the last reduction is effected along the minor axis of the last ellipse, and the percentages of reduction along the two principal axes of the first ellipse are made equal.

If one of the other regular forms produced in the cycle is desired instead of the circular form, the operations may be stopped with the desired form instead of being continued to produce the circular form. For any other shape, the nearest regular shape is taken and changed as required to produce the desired shape.

It will thus be seen that the invention provides a simple practicable and dependable method of reducing disk stock in such manner as to produce accurate predetermined circular shapes by a plurality of reducing and turning operations in which the turning may be through a number of different angles. This is possible because the invention furnishes a dependable rule or law by which to operate.

While certain embodiments of the invention have been described it is to be understood that the invention may have various embodiments within the limits of the prior art and the scope of the subjoined claims.

It is, however, an essential condition that the work-piece is not only turned but is, besides, passed through pairs of rolls, the passes whereof become progressively narrower by the same percentage, provided, that particular reasons do not give rise to a change of the rule regulating the decrease of the thickness of the sheet-metal, as has already been pointed out in the preceding pages and in which cases the width of said passes is otherwise regulated according to the change of the said rule.

I claim:

1. The method of manufacturing sheet metal disks by rolling out a disk between cylindrical rolls, comprising first rolling a circular disk work-piece into elliptical shape and then repeatedly turning it through an angle of which 90° is a multiple and further rolling it to reduce its thickness until a circular shape is again obtained, each successive pass of the work-piece between the rolls, after the first pass, being so determined that the reduction in thickness produced thereby will be of the same percentage as that of the first.

2. The method of manufacturing sheet-metal disks which comprises first rolling out a thicker circular disk of smaller diameter between cylindrical rolls whereby the work-piece is first reduced in thickness and changed into an elliptical shape, then repeatedly turning the work-piece and rolling it further to reduce it until it again becomes exactly circular, each turning being through the same angle of which 90° is a multiple and the width of the successive roll passes being so adjusted that the reduction in thickness obtained with each rolling with repeated turning through the same angle is of the same percentage as the reduction produced by the first rolling.

3. The method of manufacturing disks of malleable material, which comprises, rolling a circular disk along a first axis to thin it by a given percentage and to change it to a first elliptical shape; turning the disk through an angle which bears a low simple relation to one of the quarters of a circle, namely, 90, 180, 270, 360 degrees; rolling the disk along the new axis to reduce its thickness by the same percentage as at the first action; repeating the turning and rolling after the first said rolling action until the disk is made substantially truly circular on the first approach to circular shape, that is, until the minor axis of the first ellipse becomes equal to the major axis; and continuing the operations until the disk has the final size and thickness desired.

4. The method of manufacturing disks of malleable material, which comprises, rolling a circular disk along a first axis to thin it by a given percentage and to change it to a first elliptical shape; turning the disk through one of the angles 15, 30, 45, 60, 90 degrees; rolling the disk along the new axis to reduce its thickness by the same percentage as at the first action; repeating the turning and rolling after the first said rolling action until the disk is made substantially truly circular on the first approach to circular shape, that is, until the minor axis of the first ellipse becomes equal to the major axis; and continuing the operations until the disk has the final size and thickness desired.

5. The method of manufacturing disks of malleable material, which comprises, rolling a circular disk along a first axis to thin it by a given percentage and to change it to a first elliptical shape, turning the disk through one of the angles 15, 30, 45, 60, 90 degrees; rolling the disk along the new axis to reduce its thickness by the same percentage as at the first action; and repeating the turning and rolling after the first said rolling action until the total number of rollings along different axes, including the first, equals the quotient obtained by dividing 90 degrees by half the angle of turning; the total angle of turning being equal to the total number of rollings, minus one, multiplied by the angle of turning, whereby the disk is made substantially truly circular by making the minor axis of the first said ellipse equal to the major axis thereof before further rolling operations are performed on the disk, for the purposes set forth.

6. The method of manufacturing disks of malleable material, which comprises, rolling a circular disk along a first axis to thin it by a given percentage and to change it to a first elliptical shape; turning the disk through one of the angles 15, 30, 45, 60, 90 degrees; rolling the disk along the new axis to reduce its thickness by the same percentage as at the first action; and repeating the turning and rolling after the first said rolling action until the total number of rollings along different axes, including the first, equals the quotient obtained by dividing 90 degrees by half the angle of turning; the total angle of turning being equal to the total number of rollings, minus one, multiplied by the angle of turning, and the last rolling to return the disk to circular shape being effected along the minor axis of the last formed ellipse, whereby the disk is made substantially truly circular by making the minor axis of the first said ellipse equal to the major axis thereof before further rolling operations are performed on the disk, for the purposes set forth.

HANS SCHUSTER.